United States Patent
Okada et al.

(10) Patent No.: US 7,809,481 B2
(45) Date of Patent: Oct. 5, 2010

(54) VEHICLE ABNORMALITY MONITORING APPARATUS

(75) Inventors: Kazunori Okada, Chiryu (JP); Kokichi Shimizu, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/543,238

(22) Filed: Oct. 5, 2006

(65) Prior Publication Data
US 2007/0083305 A1 Apr. 12, 2007

(30) Foreign Application Priority Data
Oct. 11, 2005 (JP) .................... 2005-296620

(51) Int. Cl.
G01M 17/00 (2006.01)
G06F 17/18 (2006.01)
(52) U.S. Cl. ......................... 701/29; 701/33
(58) Field of Classification Search ............ 701/24, 701/29, 30, 31, 33, 34, 35
See application file for complete search history.

(56) References Cited

U.S. PATENT DOCUMENTS

| | | | | |
|---|---|---|---|---|
| 5,010,560 A * | 4/1991 | Janney et al. | ................ | 377/20 |
| 5,212,806 A * | 5/1993 | Natarajan | ................... | 455/525 |
| 5,479,347 A * | 12/1995 | Oguro et al. | ................ | 701/35 |
| 5,627,528 A * | 5/1997 | Kuznicki | .................. | 340/7.22 |
| 5,790,572 A * | 8/1998 | Oguro et al. | ............... | 714/798 |
| 5,848,365 A * | 12/1998 | Coverdill | ..................... | 701/35 |
| 6,225,898 B1 * | 5/2001 | Kamiya et al. | ............... | 340/505 |
| 6,256,594 B1 | 7/2001 | Yamamoto et al. | | |
| 6,493,618 B2 * | 12/2002 | Nada | ............................ | 701/34 |
| 6,553,289 B2 * | 4/2003 | Maki et al. | .................... | 701/29 |
| 6,567,730 B2 * | 5/2003 | Tanaka | ........................ | 701/33 |
| 6,609,051 B2 * | 8/2003 | Fiechter et al. | ............... | 701/33 |
| 6,732,031 B1 * | 5/2004 | Lightner et al. | ............... | 701/33 |
| 6,745,151 B2 | 6/2004 | Marko et al. | | |
| 6,859,699 B2 * | 2/2005 | Carroll et al. | ................. | 701/33 |
| 6,898,494 B2 * | 5/2005 | Nada | ........................... | 701/35 |
| 6,954,689 B2 * | 10/2005 | Hanson et al. | ................ | 701/33 |
| 7,003,289 B1 * | 2/2006 | Kolls | ........................ | 455/422.1 |
| 7,010,416 B2 * | 3/2006 | Lewis | .......................... | 701/109 |

(Continued)

FOREIGN PATENT DOCUMENTS

DE 10329871 1/2005

(Continued)

OTHER PUBLICATIONS

EPO Extended Search Report dated Jan. 18, 2007.

(Continued)

Primary Examiner—Khoi Tran
Assistant Examiner—Bhavesh V Amin
(74) Attorney, Agent, or Firm—Nixon & Vanderhye, PC

(57) ABSTRACT

An engine control unit has a data memory for storing freeze frame data that is data indicating the operating status of vehicle equipment at the time when an abnormality of the vehicle equipment is detected. The engine control unit saves the freeze frame data stored in the data memory in a storage unit of a management station outside the vehicle through radio communication. The engine control unit determines the properness of the communication and performs a memory operation for erasing the relevant freeze frame data from the data memory based on a determination that the communication has been properly performed.

22 Claims, 12 Drawing Sheets

U.S. PATENT DOCUMENTS

| | | | |
|---|---|---|---|
| 2002/0002430 A1* | 1/2002 | Nada ........................... | 701/35 |
| 2002/0181637 A1* | 12/2002 | Nakabayashi ............... | 375/358 |
| 2003/0051170 A1* | 3/2003 | Spearman ................... | 713/201 |

FOREIGN PATENT DOCUMENTS

| JP | 62-094443 | 4/1987 |
|---|---|---|
| WO | WO 2005/064546 A1 | 7/2005 |

OTHER PUBLICATIONS

Office Action issued Jun. 20, 2008 in corresponding Chinese Application No. 2006101423687 with an at least Partial English-language translation thereof.

* cited by examiner

FIG. 16

FFD1

| DATA AT DETECTION | DATA 1 BEFORE DETECTION | DATA 2 BEFORE DETECTION | DATA 3 BEFORE DETECTION | DATA AFTER DETECTION |
|---|---|---|---|---|
| CODE (0, 0, 0) | | | | |
| E/S (0, 0, 1) | E/S (0, 1, 1) | E/S (0, 2, 1) | E/S (0, 3, 1) | E/S (0, 4, 1) |
| A/A (0, 0, 2) | A/A (0, 1, 2) | A/A (0, 2, 2) | A/A (0, 3, 2) | A/A (0, 4, 2) |
| V/S (0, 0, 3) | V/S (0, 1, 3) | V/S (0, 2, 3) | V/S (0, 3, 3) | V/S (0, 4, 3) |
| W/T (0, 0, 4) | W/T (0, 1, 4) | W/T (0, 2, 4) | W/T (0, 3, 4) | W/T (0, 4, 4) |
| ⋮ | ⋮ | ⋮ | ⋮ | ⋮ |
| TIME (0, 0, n) | | | | |

FFD2

| DATA AT DETECTION | DATA 1 BEFORE DETECTION | DATA 2 BEFORE DETECTION | DATA 3 BEFORE DETECTION | DATA AFTER DETECTION |
|---|---|---|---|---|
| CODE (1, 0, 0) | | | | |
| E/S (1, 0, 1) | E/S (1, 1, 1) | E/S (1, 2, 1) | E/S (1, 3, 1) | E/S (1, 4, 1) |
| A/A (1, 0, 2) | A/A (1, 1, 2) | A/A (1, 2, 2) | A/A (1, 3, 2) | A/A (1, 4, 2) |
| V/S (1, 0, 3) | V/S (1, 1, 3) | V/S (1, 2, 3) | V/S (1, 3, 3) | V/S (1, 4, 3) |
| W/T (1, 0, 4) | W/T (1, 1, 4) | W/T (1, 2, 4) | W/T (1, 3, 4) | W/T (1, 4, 4) |
| ⋮ | ⋮ | ⋮ | ⋮ | ⋮ |
| TIME (1, 0, n) | | | | |

FFD3

| DATA AT DETECTION | DATA 1 BEFORE DETECTION | DATA 2 BEFORE DETECTION | DATA 3 BEFORE DETECTION | DATA AFTER DETECTION |
|---|---|---|---|---|
| CODE (2, 0, 0) | | | | |
| E/S (2, 0, 1) | E/S (2, 1, 1) | E/S (2, 2, 1) | E/S (2, 3, 1) | E/S (2, 4, 1) |
| A/A (2, 0, 2) | A/A (2, 1, 2) | A/A (2, 2, 2) | A/A (2, 3, 2) | A/A (2, 4, 2) |
| V/S (2, 0, 3) | V/S (2, 1, 3) | V/S (2, 2, 3) | V/S (2, 3, 3) | V/S (2, 4, 3) |
| W/T (2, 0, 4) | W/T (2, 1, 4) | W/T (2, 2, 4) | W/T (2, 3, 4) | W/T (2, 4, 4) |
| ⋮ | ⋮ | ⋮ | ⋮ | ⋮ |
| TIME (2, 0, n) | | | | |

VEHICLE ABNORMALITY MONITORING APPARATUS

CROSS REFERENCE TO RELATED APPLICATION

This application is based on and incorporates herein by reference Japanese Patent Application No. 2005-296620 filed on Oct. 11, 2005.

FIELD OF THE INVENTION

The present invention relates to a vehicle abnormality monitoring apparatus, which monitors abnormalities of vehicle equipment and stores and holds freeze frame data that is data indicating the operating status of the vehicle equipment at the time when an abnormality of the vehicle is detected.

BACKGROUND OF THE INVENTION

As is well-known, control over various types of vehicle equipment is exercised on a vehicle, including control over fuel injection of a vehicle engine. In the case of the control over vehicle engine fuel injection, the air-fuel ratio of a mixture for combustion is recognized each time the mixture is supplied based on a signal output by an oxygen sensor for detecting the concentration of oxygen in the exhaust pipe. The amount of fuel injection is controlled according to the recognition (the mixture is recognized to be rich or lean) to reduce the amount of harmful substances included in the exhaust gas. However, such control may adversely affect engine output and may even increase the amount of harmful substances included in the exhaust gas against what is intended when proper control over the fuel injection amount is disabled by, for example, an abnormality of the oxygen sensor.

It is therefore proposed to provide a vehicle with a vehicle abnormality monitoring apparatus for monitoring abnormalities of various vehicle equipment including a vehicle engine. Specifically, such a vehicle abnormality monitoring apparatus monitors abnormalities of vehicle equipment based on, for example, a signal output by a sensor for detecting a physical quantity which varies depending on the operating status of the vehicle equipment. When an abnormality of the sensor or another type of vehicle equipment is detected, the vehicle abnormality monitoring apparatus stores and holds in a data memory an abnormality code associated with the abnormality or monitoring data such as freeze frame data that is data indicating the operating status of the vehicle equipment at the time when the abnormality of the vehicle equipment is detected. In addition, a fail-safe function set in advance in association with the abnormality code thus stored and maintained is executed, and other control units are instructed to execute the same fail-safe function. The freeze frame data among data stored in the data memory is normally output from the data memory to an external tool through wire communication and used to analyze the cause of the abnormality of the vehicle equipment when the vehicle equipment is repaired or inspected.

In order to satisfy recent requirements associated with environmental preservation and safety of vehicles, control is frequently exercised to compensate for fluctuating physical characteristics. Examples of such control include control over the fuel injection of a vehicle engine as described above and control over the brake of a vehicle. Types and quantity of vehicle equipment provided for exercising such control are on the increase year after year, such equipment including oxygen sensors for detecting the concentration of oxygen in an exhaust pipe and vehicle speed sensors for detecting the traveling speed of a vehicle. That is, in a vehicle diagnosis apparatus, types and amount of monitoring data to be stored in the data memory are increasing, and it may become difficult to properly store and hold the monitoring data depending on the capacity of the data memory.

Under the circumference, proposals are made in the a related art, including a vehicle abnormality monitoring apparatus adapted to save (transfer) freeze frame data among monitoring data stored in a data memory in a data storage unit of a management station which is provided outside the vehicle and which transmits and receives information to and from the vehicle abnormality monitoring apparatus through radio communication, as disclosed in U.S. Pat. No. 6,256,594 (JP-11-65645A).

As described above, the freeze frame data is stored and maintained to be used for analyzing the cause of an abnormality of vehicle equipment. In this sense, it is not essential to store and hold such data in the data memory of the vehicle abnormality monitoring apparatus. In this regard, in the vehicle abnormality monitoring apparatus disclosed in U.S. Pat. No. 6,256,594, since the freeze frame data is stored and maintained in the data storage unit of a management station available to many vehicles, the corresponding data in the data memory may be erased.

As thus described, in the case of the vehicle abnormality monitoring apparatus according to the related art, since freeze frame data which has been completely transferred may be erased from the data memory, a greater amount of monitoring data can be stored and maintained (accumulated) in the same data memory.

In the vehicle abnormality monitoring apparatus according to the related art, however, a transfer error can occur when freeze frame data stored in the data memory is transmitted to the management station on a radio communication basis, and such data having an error can consequently be stored in the data storage unit of the management station. In case that the freeze frame data stored and maintained in the data memory is erased in such a situation, the reliability of the freeze frame data itself can be significantly reduced.

SUMMARY OF THE INVENTION

It is an object of the invention to provide a vehicle abnormality monitoring apparatus, which can store and hold a greater amount of abnormality monitoring data with higher reliability even in the presence of a limitation on the capacity of a data memory incorporated therein.

According to one aspect of the present invention, a vehicle abnormality monitoring apparatus comprises an electronic unit including a data memory for storing abnormality analysis data used for analyzing abnormality of vehicle equipment, and a storage unit provided separately from the electronic unit for storing the abnormality analysis data when transmitted from the data memory through communication. The electronic unit determines properness of the communication, and performs a memory operation of erasing the abnormality analysis data from the data memory when the communication is proper.

The abnormality analysis data may be freeze frame data indicating an operating status of the vehicle equipment at the time when an abnormality of the vehicle equipment is detected as a result of abnormality monitoring on the vehicle equipment performed based on a sensor output from a sensor for detecting a physical quantity which changes depending on the operating status of the vehicle equipment.

The electronic unit maintains a supply of power from a vehicle battery for a time period required for saving the freeze frame data when a key switch of the vehicle is turned off when the freeze frame data is being saved.

The storage unit may be provided in a management station for managing the freeze frame data outside the vehicle. The saving of the freeze frame data through communication is executed through radio communication with the management station. The electronic unit determines that the communication is properly performed based on information indicating proper reception of the freeze frame data provided by the management station.

BRIEF DESCRIPTION OF THE DRAWINGS

FIG. 16 shows a memory structure of a backup area in which time-sequential freeze frame data is stored.

DETAILED DESCRIPTION OF THE EMBODIMENT

First Embodiment

Figure 1:
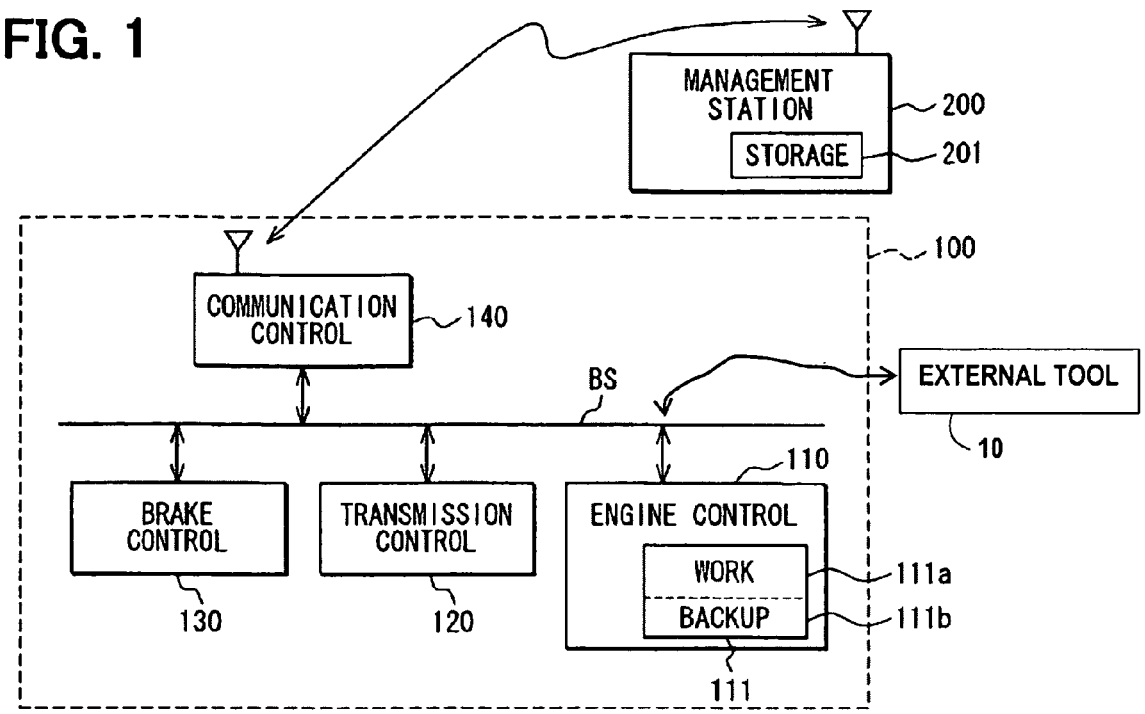
FIG. 1 is a block diagram showing a system employing a vehicle abnormality monitoring apparatus according to a first embodiment.

Referring first to FIG. 1, a vehicle abnormality monitoring apparatus of the present embodiment is used in a system in which information is exchanged between each vehicle 100 and a management station 200 through radio communication.

In the system, the management station 200 acquires vehicle information such as the operating status and abnormality monitoring data at each vehicle 100 through radio communication and conducts comprehensive management of the information. For example, the station 200 is configured with elements such as a processing unit (not shown) of a known type, a communication apparatus (not shown), and a storage unit 201 constructed with a non-volatile memory such as a hard disk.

The vehicles have an on-vehicle network constructed with a plurality of electronic control units for decentralized control of various types of vehicle equipment, e.g., a bus type network system such as a CAN (Control unit Area Network). For example, the vehicle 100 has an on-vehicle network constructed with electronic control units such as an engine control unit 110 for controlling the fuel injection of the vehicle engine, a transmission control unit 120 for controlling the automatic switching of the transmission gear ratio, a brake control unit 130 for controlling the brake of the vehicle, and a communication control unit 140 for exchanging information with the management station 200 through radio communication. The management station conducts comprehensive management of various types of information on a plurality of vehicles including the vehicle 100.

The control status and control results of each of the electronic control units 110 to 140 are exchanged between those electronic control units through a communication bus BS to which the electronic control units are electrically connected. Normally, a control program stored in a read only memory incorporated in each of the electronic control units 110 to 140 itself is executed based on the information thus exchanged and control data stored in advance, and the above control activities are executed in a harmonized way. For example, when the transmission control unit 120 receives a detection signal (binary signal) from a vehicle speed sensor provided on an output shaft of the transmission, the control unit generates data indicating vehicle speed information based on the detection signal and transmits it onto the communication bus BS 101 as serial data, for example. The serial data is fetched by, for example, the brake control unit 130 to be used by the brake control unit 130 to control the brake of the vehicle as described above. In addition to the read-only memory, each of the electronic control units includes well-known features provided therein such as an arithmetic unit for reading and executing program data stored in the memory, a data memory for storing results of calculations performed by the arithmetic unit, and a communication unit for exchanging information with other electronic control units.

In such an on-vehicle network, abnormality monitoring on the vehicle equipment including the vehicle engine is carried out based on information exchanged through the communication bus BS. For example, the engine control unit (vehicle abnormality monitoring apparatus) 110 monitors abnormalities of an oxygen sensor and other types of vehicle equipment based on data indicating the operating status of the same. When an abnormality of the vehicle equipment is detected as the result of abnormality monitoring, an abnormality code associated with the abnormality or monitoring data such as freeze frame data that is data indicating the operating status of the vehicle equipment at the time when the abnormality is detected is stored and maintained in a data memory 111 incorporated in the engine control unit 110 itself. In addition, a fail-safe function that is set in advance in association with the abnormality code stored and maintained in the data memory 111 is executed, and other control units are instructed to execute the same fail-safe function. Through such processes, proper control over the amount of fuel injected into the vehicle engine is continued, for example, even in the case of an abnormality of the oxygen sensor.

As described above, however, the freeze frame data among the monitoring data stored in the data memory 111 is held to be used for analyzing the cause of an abnormality of the vehicle equipment. It is not essential that such data is stored and maintained in the data memory 111 in the engine control unit 110. In the case of the engine control unit 110, therefore, the freeze frame data stored in the data memory 111 is saved in the storage unit 201 at the management station 200 using communication. At this time, the properness of the communication is determined, and a memory operation is performed to erase the freeze frame data of interest from the data memory 111, when it is determined that the communication has been properly performed. Such a configuration makes it possible to store and hold a greater amount of monitoring data with higher reliability while limiting the capacity of the storage medium in the vehicle to a preferable amount. In addition, the management station 200 of the present embodiment acquires information on vehicles, in particular, the freeze frame data through radio communication and conducts comprehensive management of the information as described above. Therefore, the freeze frame data can be more easily utilized to provide various advantages.

For example, the management station 200 provided outside the vehicles can notify the user (driver) of a vehicle of interest the fact that an abnormality of the vehicle equipment has been detected. It is also possible to collect statistics of vehicle equipment abnormalities of, for example, each vehicle type or production lot and to make use of the statistics in vehicle development (e.g., safety measures). As a result, adequate services will become available, in particular, when vehicle maintenance is carried out.

As the data memory 111, the engine control unit 110 of the present embodiment employs a random access memory (RAM) whose memory area is partially backed up by a vehicle battery. It is assumed that an abnormality of the vehicle equipment is detected as a result of the above abnormality monitoring. Then, the engine control unit 110 first stores data indicating the operating status of the relevant vehicle equipment in a work area (volatile memory) 111a of the data memory 111 which is not backed up as described above. Thereafter, the data stored in the work area 111a is temporarily saved as freeze frame data in a backup area (non-volatile memory) 111b of the data memory 111 that is backed up. In such a configuration, the freeze frame data can be properly stored and maintained in the backup area 111b until the freeze frame data is saved in the storage unit 201 at the management station 200. However, after the freeze frame data stored in the backup area 111b is saved in the storage unit 201 at the management station 200, the engine control unit 110 performs a memory operation to erase the freeze frame data in the backup area 111b, as described above.

The freeze frame data used by the engine control unit 110 of the present embodiment is time-sequential freeze frame data which is data indicating the operating status of the vehicle equipment at the point in time when an abnormality of the vehicle equipment is detected and the status before and after the point in time.

Figure 2:
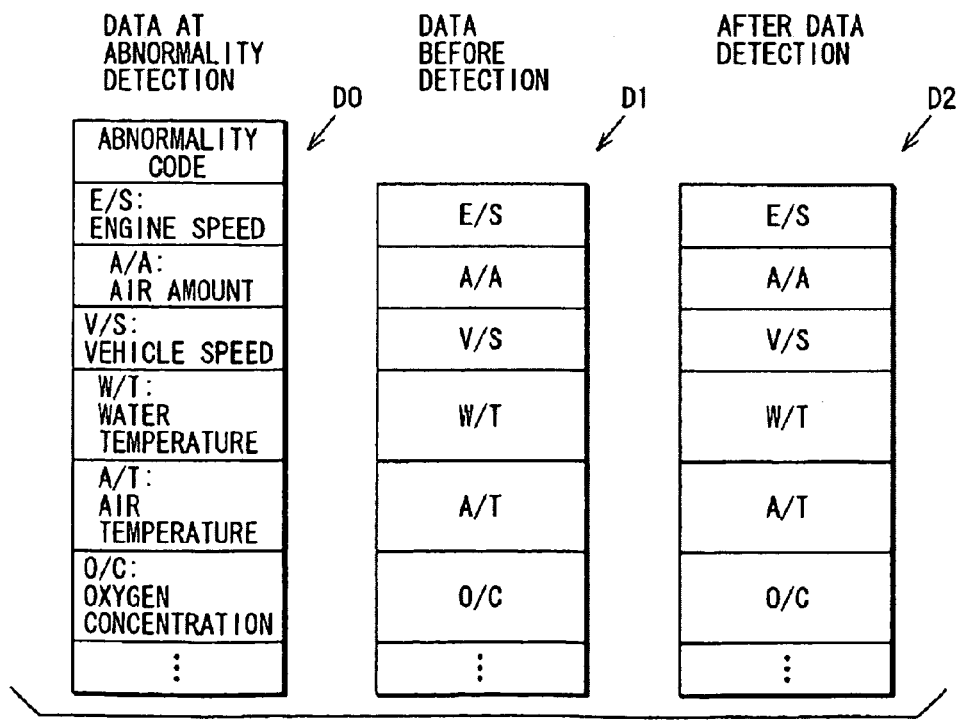
FIG. 2 is a diagram schematically showing time-sequential freeze frame data in the embodiment.

Such time-sequential freeze frame data are shown in FIG. 2.

The time-sequential freeze frame data includes data D0 constructed with data indicating the operating status of the vehicle equipment at the time when an abnormality of the vehicle equipment is detected and an abnormality code associated with the same, data D1 representing the operating status of the vehicle equipment before the abnormality is detected, and data D2 representing the operating status of the vehicle equipment after the abnormality is detected. The operating status of vehicle equipment is normally indicated by values output by vehicle sensors such as, a value output by a crank sensor for detecting the mode of rotation of the engine crankshaft (E/S: engine speed), a value output by an air-flow sensor for detecting the amount of intake air of the engine (A/A: intake air amount), a value output by a vehicle speed sensor provided on the output shaft of the transmission (V/S: vehicle speed), a value output by a water temperature sensor (W/T: water temperature), a value output by an intake air temperature sensor for detecting the temperature of the intake air of the engine (A/T: intake air temperature), and a value output by an oxygen sensor for detecting air-fuel ratio in the exhaust pipe (O/C: oxygen concentration).

As will be apparent from the above, the time-sequential freeze frame data represents changes in the operating status of the vehicle equipment in a period around the time when an abnormality of the vehicle equipment occurred, and the data allows a closer analysis of the cause of the abnormality. However, when compared to freeze frame data including only the data D0 indicating the operating status of the vehicle equipment at the point in time when the abnormality of the vehicle equipment occurred, such time-sequential freeze frame data includes a greater amount of information because of its data structure. Therefore, the data inevitably has some influence on the vacancy of the capacity of the data memory 111. From this reason, in the engine control unit 110 of the present embodiment, freeze frame data is erased in an active manner from the backup area 111b of the data memory provided that the freeze frame data is determined to have been properly saved outside the memory as described above. As a result, a greater amount of monitoring data can be stored and maintained with high reliability even when such time-sequential freeze frame data is used. Thus, a closer analysis can therefore be made on the cause of an abnormality of the vehicle equipment based on such time-sequential freeze frame data.

Figure 3A:
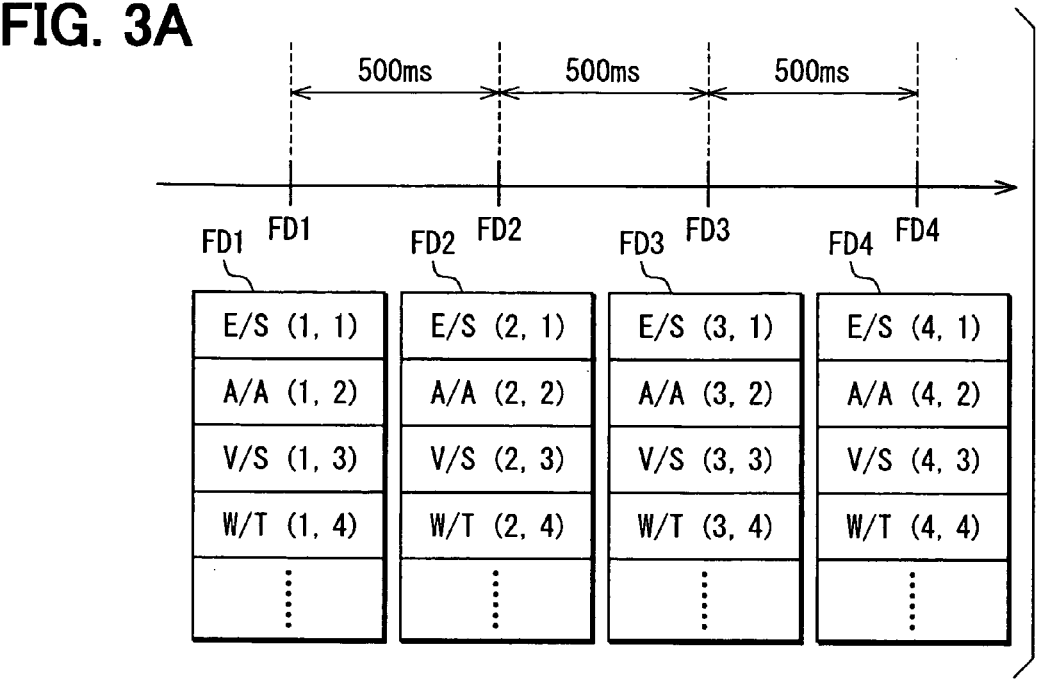
FIGS. 3A and 3B are diagrams showing a mode of storage of data indicating operating status of vehicle equipment in a work area according to the embodiment.
Figure 3B:
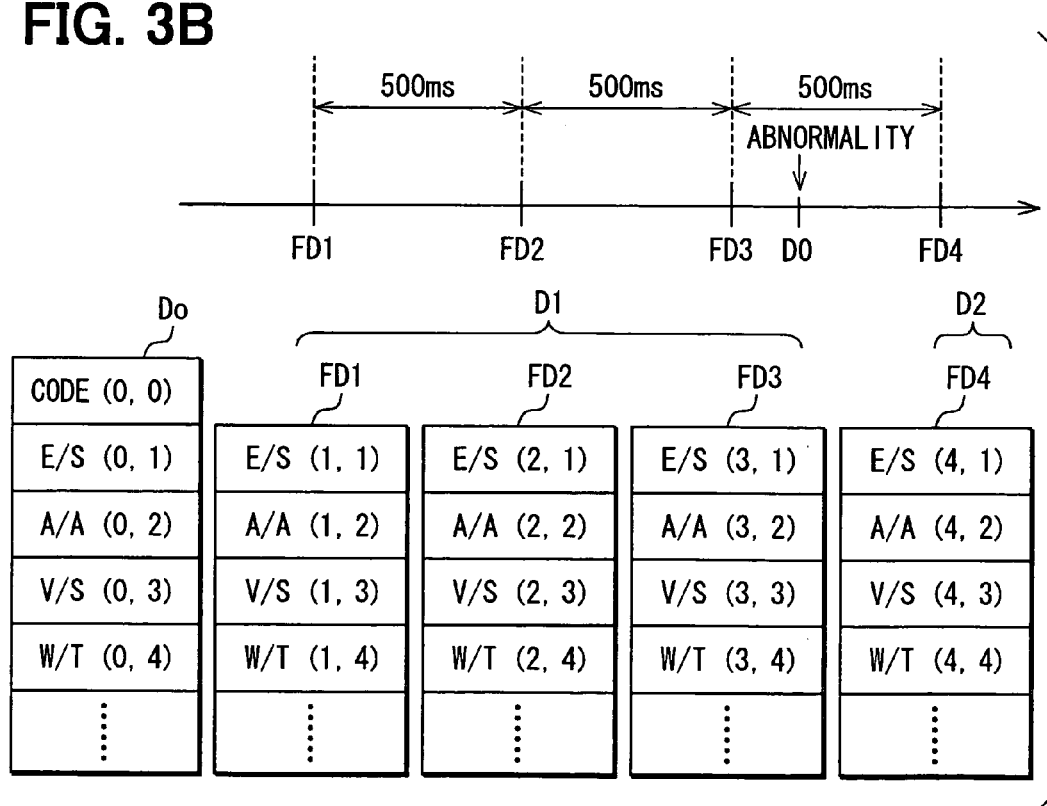

Next, a description will now be made with reference FIGS. 3A and 3B on the memory operation performed by the engine control unit 110 when such time-sequential freeze frame data is stored in the backup area 111b of the data memory 111. In FIGS. 3A and 3B, each item of data is followed by (i,j), "i" indicating the place of the data in a sampling sequence, "j" indicating the type of the data. In FIGS. 3A and 3B, an item of data for which a sampling sequence value "0" is set is data sampled at a time when there is abnormality.

In this process, as shown in FIG. 3A, data indicating the operating status of the vehicle equipment is first stored in the work area 111a of the data memory 111 on a time-sequential basis.

Specifically, four items of data FD1 to FD4 sampled at predetermined intervals (e.g., 500 ms) are stored (updated) in the work area 111a of the data memory 111 each time a logical AND condition is satisfied where (A) a relationship between the data FD1 to FD4 and addresses associated with the sampling sequence of the data FD1 to FD4 is maintained and (B) the data FD1 to FD4 are sequentially shifted on a first-in first-out basis. For example, when an abnormality of the vehicle equipment is detected at the timing shown in FIG. 3B, the data FD1 to FD3 are set as the data D1 representing the operating status of the vehicle equipment before the detection of the abnormality whereas the data D0 represents the operating status of the vehicle equipment at the time of detection. In addition, the data FD4 is set as the data D2 representing the operating status of the vehicle equipment after the detection of the abnormality. The data D0 to D2 thus set are associated with each other as time-sequential freeze frame data as described above, and the items of data associated with each other are temporarily saved in the backup area 111b as time-sequential freeze frame data. Thus, time-sequential freeze frame data is stored in the backup area 111b of the data memory 111.

Figure 4:
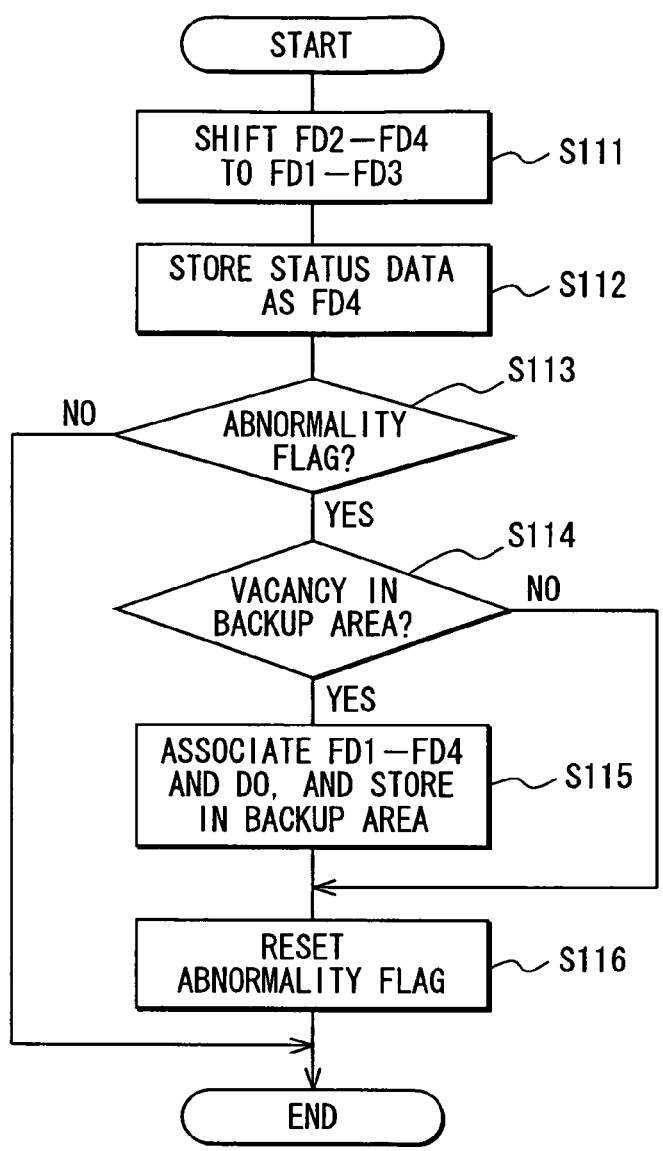
FIG. 4 is a flow chart showing a memory operating procedure for storing the data indicating the operating status of vehicle equipment in the work area according to the embodiment.
Figure 5:
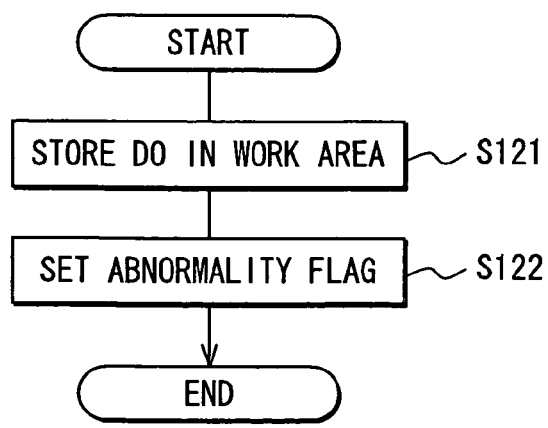
FIG. 5 is a flow chart showing a flag processing procedure for storing the data indicating the operating status of vehicle equipment in the work area according to the embodiment.

The memory operating procedure will be described further with reference to FIGS. 4 and 5. FIG. 4 shows processes repeated at predetermined intervals (e.g. 500 ms). FIG. 5 shows processes executed based on the detection of an abnormality of the vehicle equipment as a result of the abnormality monitoring described above.

Referring to the processes, the engine control unit 110 first stores (updates) the four items of data FD1 to FD4 (FIG. 3A) in the work area 111a of the data memory 111 as processes at steps S111 and S112 as shown in FIG. 4 when the logical AND condition is satisfied between the conditions (A) and (B). Specifically, at the process of step S111, data FD2 to FD4 among the data FD1 to FD4 (FIG. 3A) which have already been stored in the work area 111a of the data memory 111 are shifted to become data FD1 to FD3, respectively. At the process of the next step S112, data indicating the operating status of the vehicle equipment at that time is newly stored in an address of the work area 111a associated with the above sampling sequence, and the data constitutes data FD4.

Next, as a process at step S113, a determination is made on whether an abnormality occurrence flag has been set or not, the flag indicating that an abnormality of the vehicle equipment has been detected as a result of the abnormality monitoring. For example, the abnormality occurrence flag is stored in the data memory 111, and the state of the flag is operated by the engine control unit 110. Specifically, as shown in FIG. 5, the abnormality occurrence flag is set (step S122) on condition that the data D0 (FIG. 3B) has been stored in the work area 111a of the data memory 111 at the time of detection of the abnormality of the vehicle equipment as a result of the abnormality monitoring.

Therefore, when the abnormality occurrence flag is set at the process of step S113, there is a situation as shown in FIG. 3B in which an abnormality of the vehicle equipment has been detected between the data FD3 as a result of the shifting at the process of step S112 and the data FD4 newly stored at the process of the step S113. In this case, the engine control unit 110 associates the data D0 with the data FD1 to FD4 in the work area 111a (step S115) on condition that the backup area 111b has a vacant capacity sufficient to store the time-sequential freeze frame data (step S114). The items of data associated with each other are temporarily saved in the backup area 111b as the time-sequential freeze frame data (step S115). This control is terminated when the abnormality occurrence flag is reset as a process at step S116.

However, when the backup area 111b has no vacant capacity sufficient to save the time-sequential freeze frame data temporarily, the control is terminated when the process at step S116 is executed without executing the process at step S115.

When the abnormality occurrence flag is not set at the process of step S113, there is a situation as shown in FIG. 3A. In this case, therefore, the processes at steps S111 and S112 are repeated at the predetermined intervals until it is determined that the abnormality occurrence flag is set.

Figure 6:
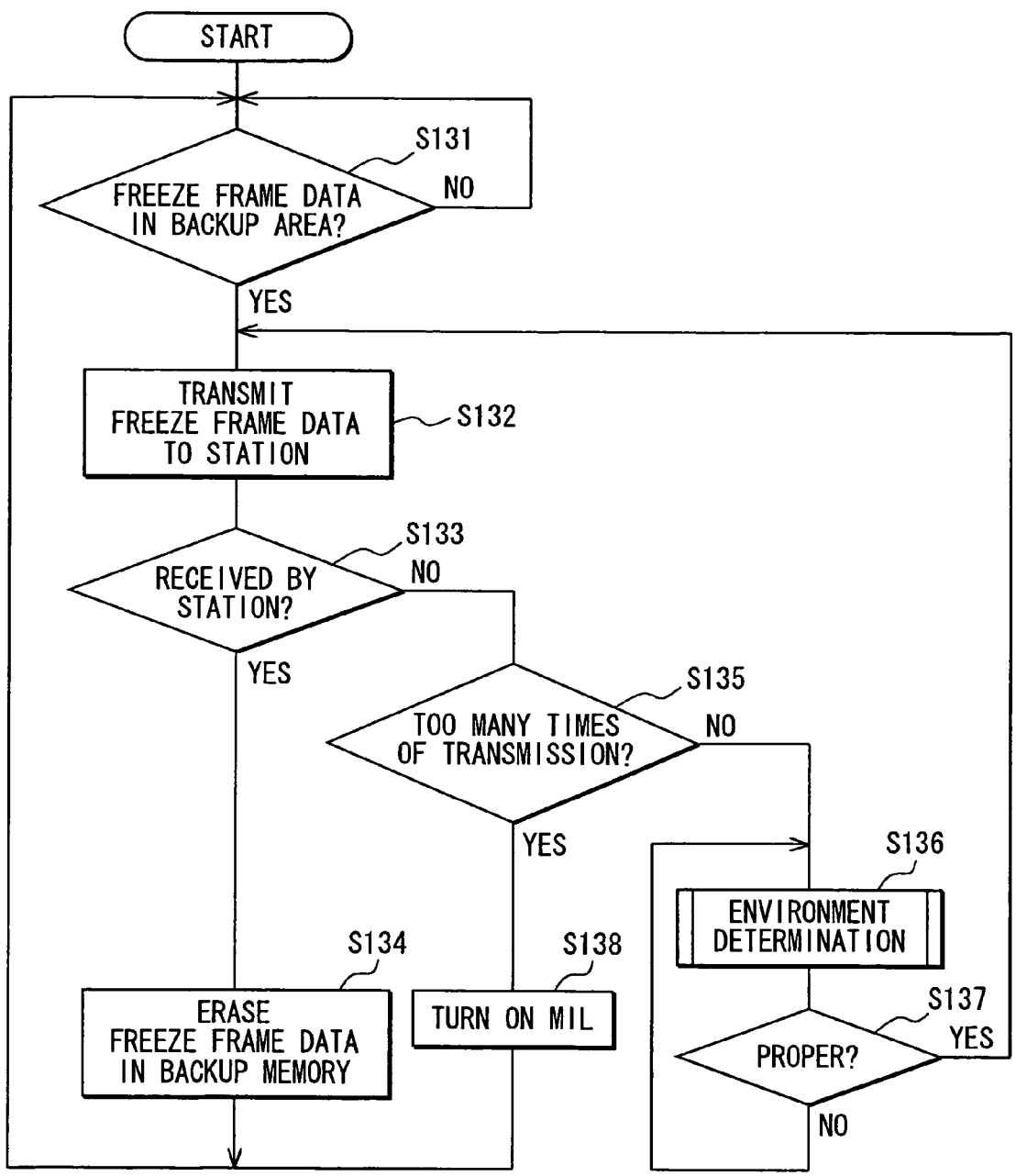
FIG. 6 is a flow chart showing a memory operating procedure for an operation of erasing time-sequential freeze frame data from a backup area performed by the vehicle abnormality monitoring apparatus (engine control unit) according to the embodiment.

A memory operating procedure for erasing the time-sequential freeze frame data stored in the backup area 111b is described with reference to the memory operating procedure of FIG. 6. During this memory operation, radio communication between the engine control unit 110 and the management station 200 takes place with the intervention of the communication control unit 140.

When the time-sequential freeze frame data is stored in the backup area 111b (step S131), the engine control unit 110 first transmits (transfers) the time-sequential freeze frame data to the management station 200 through radio communication (step S132). Next, the properness of the communication is determined, and the time-sequential freeze frame data is erased from the backup area 111b (step S134) when it is determined that the communication has been properly performed and the data is received by the management station 200 (step S133). In the present embodiment, each time the time-sequential freeze frame data is stored in the backup area 111b, such processes (at steps S132 to S134) are performed by the engine control unit 110 to maintain a vacant capacity in the backup area 111b in a preferable manner.

In the present embodiment, it is determined that proper communication has been made (at step S133) based on the fact that the management station 200 has provided information indicating proper reception of time-sequential freeze frame data within a predetermined period of time after the transmission of the time-sequential freeze frame data (reception complete notice). In case that the reception complete notice is not received, the engine control unit 110 executes processes for re-transmitting the same freeze frame data to the management station 200 (steps S135 to S137). First, the number of consecutive re-transmissions of the time-sequential freeze frame data is counted as a process at step S135, and it is determined whether the counted number of consecutive re-transmissions has exceeded an upper limit value that is a number of times at which there is a concern about an abnormality of the communicating function of the vehicle 100 and the management station 200 themselves.

As will be described later, when the counted number of consecutive re-transmissions is equal to or smaller than the upper limit value, the control unit waits until it is determined that there is a proper environment for communication with the management station 200 as processes at steps S136 and S137. When it is determined that there is a proper environment for communication with the management station 200, the engine control unit 110 proceeds to the process at step S132 again, and the time-sequential freeze frame data is re-transmitted at the process of step S132. That is, the processes at steps S135 to S137 and step S132 are basically repeated in such a case until the communication complete notice is transmitted from the management station 200.

When the counted number of consecutive re-transmissions exceeds the upper limit value at the process of step S135 as a result of the repetition of such a re-transmission process, the re-transmission process is stopped on an assumption that abnormality may have occurred in the communicating function of the vehicle 100 and the management station 200 themselves. The driver is notified of the state of abnormality by turning on of an abnormality indicating light (MIL) (step S138). The execution of the memory operation itself (FIG. 6) may be inhibited when the MIL is turned on.

The procedure for the process of determining communication environment executed by the engine control unit 110 (step S137) will now be described with reference to FIG. 7.

Information on data other than data associated with the time-sequential freeze frame data is also exchanged between the vehicle 100 and the management station 200. In this regard, the engine control unit 100 determines whether the vehicle 100 is in a position where radio communication can be performed as described above based on its sensitivity exhibited in exchanging information, and the determination of communication environment is made based on the determination.

Figure 7:
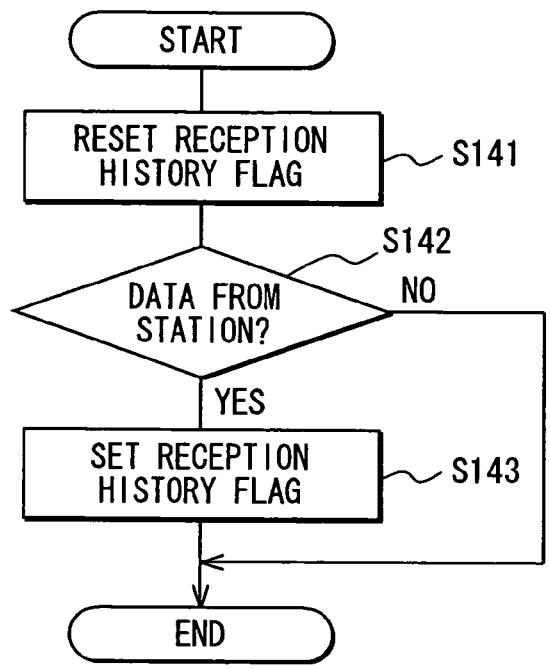
FIG. 7 is a flow chart showing a processing procedure for determination of communication environment according to the embodiment.

Specifically, to determine the communication environment, the engine control unit 110 first resets a reception history flag as a process at step S141, as shown in FIG. 7. When data other than data associated with the time-sequential freeze frame data is transmitted by the management station 200 (step S142), the control is terminated when the reception history flag is reset (step S143). As a result, it is determined at a process of step S137 (FIG. 6) that the communication environment is good based on the fact that the reception history flag is reset.

When no data is transmitted by the management station 200 other than data associated with the time-sequential freeze frame data at step S142, the control is terminated at this point without executing the process of step S143. In this case, it is determined at the process of step S137 (FIG. 6) that the communication environment is not good based on the fact that the reception history flag is reset, and the process of step S136 is repeated until the communication environment is determined good at the process of step S137.

Here, an ignition switch of the vehicle 100 may be turned off during the process of saving time-sequential freeze frame data. In case that the supply of power from the vehicle battery to the engine control unit 100 is stopped in such an occasion, the reliability of the time-sequential freeze frame data can be degraded. Under the circumstance, in the case of the engine control unit 110, the supply of power from the vehicle battery to the engine control unit 110 is maintained for the time required for the saving process where the ignition switch of the vehicle 100 can be turned off when the time-sequential freeze frame data is saved.

Figure 8:
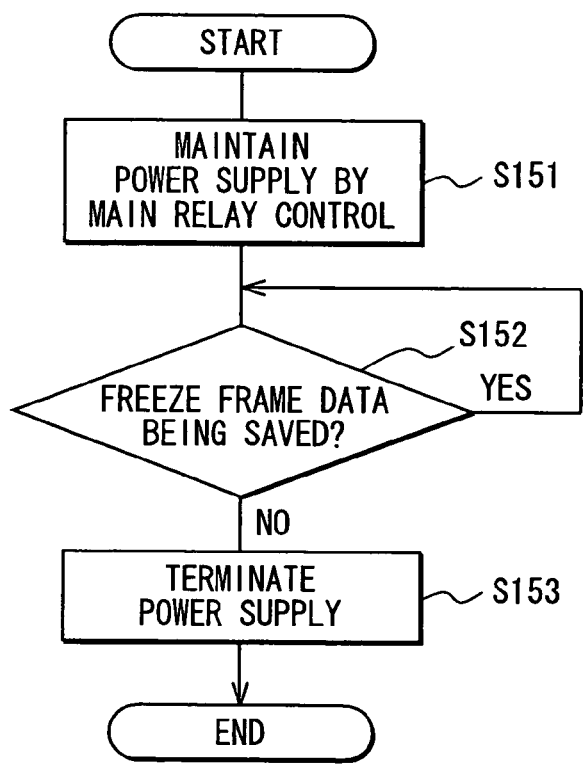
FIG. 8 is a flow chart showing a processing procedure for a process performed when an ignition switch is turned off in the embodiment.

A procedure for processes performed by the engine control unit 110 when the ignition switch is turned off in the form of a flow chart is shown in FIG. 8.

When the ignition switch is turned off, the engine control unit 110 first maintains the supply of power from the vehicle battery on the basis of main relay control as a process at step S151. Next, it is determined as a process at step S152 whether the time-sequential freeze frame data is being saved or not. When it is stated that the data is being saved, the data may be in the process of saving it from the work area 111a to the backup area 111b, and the data may alternatively be in the process of saving it from the backup area 111b to the storage unit 201 at the management station 200. When either of the saving processes is being executed, the control waits until the saving process is completed. When the process of saving the time-sequential freeze frame data is completed, the control is terminated at the point in time when the supply of power from the vehicle battery on the basis of main relay control becomes no longer maintained (step S153).

As described above, the vehicle abnormality monitoring apparatus according to the first embodiment can provide significant advantages as described below.

(1) Since freeze frame data stored in the data memory 111 incorporated in the apparatus can be erased from the data memory 111 on condition that it is determined that the freeze frame data has been properly saved outside the apparatus, a greater amount of abnormality monitoring data can be stored and maintained with higher reliability.

(2) Since the freeze frame data is saved in the storage unit 201 at the management station 200 through radio communication, the capacity of the storage medium in the vehicle 100 can be preferably suppressed. Further, adequate services can be provided when vehicle maintenance is carried out.

(3) The freeze frame data is re-transmitted to the management station 200 when the reception complete notice is not transmitted from the management station 200 within a predetermined period of time after the freeze frame data is transmitted. Therefore, exchanging information by radio communication between the vehicle 100 and the management station 200 can be carried out reliably.

(4) Since the MIL is turned on when the number of consecutive transmissions of the time-sequential freeze frame data has exceeded the upper limit value, the driver can be notified of a state of abnormality of the communication function of the vehicle 100 and the management station 200 themselves.

(5) It is determined whether the environment of communication with the management station 200 is properly established when the time-sequential freeze frame data is transmitted (steps S136 and S137), and the time-sequential freeze frame data is transmitted based on a determination that the communication environment is properly established. Thus, proper communication can be performed between the vehicle 100 and the management station 200.

(6) Information on data other than data associated with the time-sequential freeze frame data is also exchanged between the vehicle 100 and the management station 200, and it is determined whether the vehicle 100 is in a position where radio communication can be performed as described above based on its sensitivity exhibited in exchanging information. That is, since it is determined that the communication environment is properly established based on the fact that the vehicle 100 is in a position where the radio communication is enabled, the determination can be properly and easily made.

(7) The freeze frame data used as described above is time-sequential freeze frame data which is data indicating the operating status of the vehicle equipment at the point in time when an abnormality of the vehicle equipment is detected and the status before and after the point in time. A closer analysis of the cause of an abnormality of the vehicle equipment can be made based on such time-sequential freeze frame data.

(8) As the data memory 111, a random access memory (RAM) including a work area 111a and a backup area 111b is used. Data indicating the operating status of the vehicle equipment is stored in the work area 111a on a time-sequential basis. When an abnormality of the vehicle equipment is detected as a result of the above abnormality monitoring, data indicating the operating status of the vehicle equipment at that point in time is associated with data indicating the operating status of the same vehicle equipment before and after the point in time. Since the items of data thus associated are temporarily saved in the backup area 111b as time-sequential freeze frame data as described above, the time-sequential freeze frame data can be properly stored and maintained in the data memory 111 until the time-sequential freeze frame data is saved in the external management station 200.

(9) The supply of power from the vehicle battery to the engine control unit 110 is maintained for the time required for saving time-sequential freeze frame data based on the fact that the ignition switch of the vehicle 100 may be turned off when the time-sequential freeze frame data is being saved. It is therefore possible to maintain the reliability of the time-sequential freeze frame data in a preferable manner.

Second Embodiment

A vehicle abnormality monitoring apparatus of the second embodiment also monitors abnormalities of vehicle equipment including a vehicle engine based on signals output by sensors for detecting physical quantities which vary depending on the operating status of the vehicle equipment. Specifically, the apparatus is constructed with, for example, an engine control unit 110 which is one of a plurality of electronic control units for decentralized control of various types of vehicle equipment. A data memory 111 incorporated in the engine control unit 110 has substantially the same memory structure as that in the first embodiment (FIG. 1). The second embodiment is substantially the same as the first embodiment described above in that the engine control unit 110 performs memory operations on the data memory 111 as described below when an abnormality of vehicle equipment is detected through abnormality monitoring as described above.

Data indicating the operating status of the vehicle equipment at the point in time of the detection of the abnormality is associated with data indicating the operating status of the same vehicle equipment before and after the point in time in a work area 111a of the data memory 111, and the items of data associated with each other are temporarily saved in a backup area 111b as time-sequential freeze frame data as described above.

The time-sequential freeze frame data stored in the backup area 111b of the data memory 111 is saved in a storage unit provided separately through communication. The properness of the communication is determined, and the time-sequential freeze frame data is erased from the backup area 111b when it is determined that the communication has been properly performed.

The engine control unit 110 of the present embodiment is similar to that described above in that the supply of power from the vehicle battery to the engine control unit 110 is maintained for the time required for saving the time-sequential freeze frame data based on the fact that the ignition switch of the vehicle may be turned off when the data is being saved.

Figure 9:
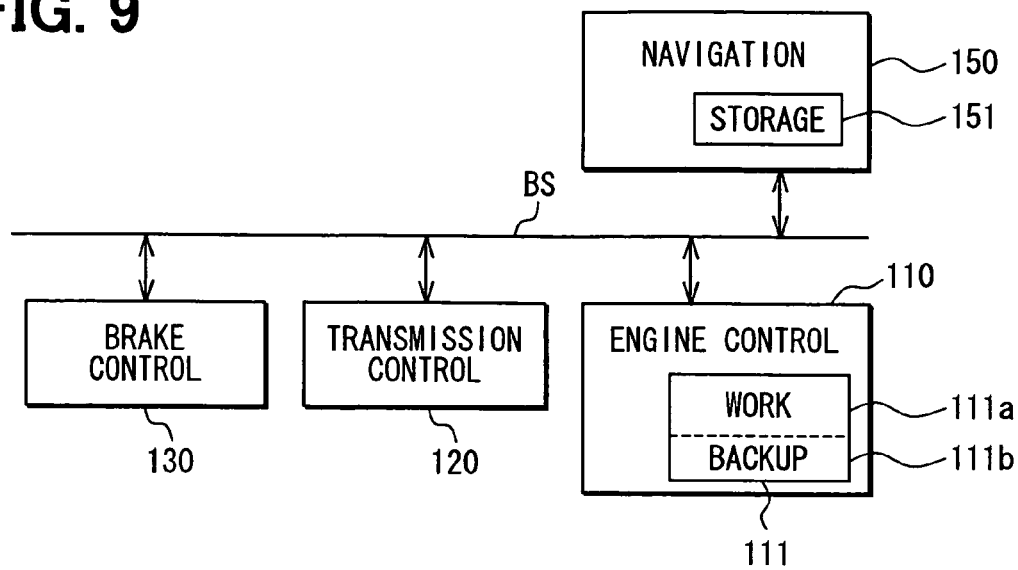
FIG. 9 is a block diagram showing a system employing a vehicle abnormality monitoring apparatus according to a second embodiment.

However, a navigation control unit (on-vehicle control unit) 150 forming part of a navigation system is connected to the on-vehicle network as one of the plurality of electronic control units for decentralized control of various types of vehicle equipment, as shown in FIG. 9. The navigation control unit 150 incorporates a storage unit 151 having a large capacity constructed with, for example, a hard disk. The engine control unit 110 of the present embodiment saves time-sequential freeze frame data as described above in the storage unit 151 through a communication bus BS. The time-sequential freeze frame data is erased from the backup area 111b on condition that the saving has been properly executed. Such a configuration also allows the capacity of the data memory 111 incorporated in the engine control unit 110 to be preferably suppressed.

Figure 10:
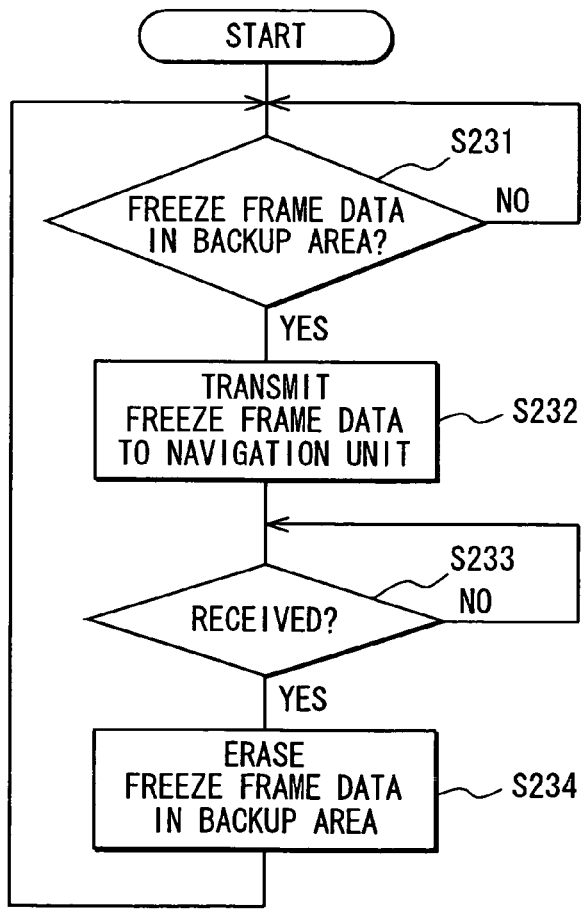
FIG. 10 is a flow chart showing a memory operating procedure for an operation of erasing time-sequential freeze frame data from a backup area performed by the vehicle abnormality monitoring apparatus (engine control unit) according to the embodiment.

A memory operating procedure of a memory operation will be described with reference to FIG. 10.

It is assumed that time-sequential freeze frame data is stored in the backup area 111b (step S231). Then, the engine control unit 110 first transmits (transfers) the time-sequential freeze frame data to the navigation control unit 150 through the communication bus BS (step S232). Next, the properness of the communication is determined, and the time-sequential freeze frame data is erased from the backup area 111b (step S234) when it is determined that the communication has been properly performed, that is, received (step S233). In the present embodiment again, each time the time-sequential freeze frame data is stored in the backup area 111b, such processes (at steps S232 to S234) are performed by the engine control unit 110 to maintain a vacant capacity in the backup area 111b in a preferable manner.

In the second embodiment, it is determined whether proper communication has been made or not (at step S233) based on the communication protocol of the on-vehicle network. Processes (such as a re-transmission process) executed when the communication is not confirmed to be proper at the process of step S233 are also executed based on the communication protocol of the on-vehicle network.

As described above, the vehicle abnormality monitoring apparatus of the second embodiment can provide advantages which are basically the same or substantially the same as those listed in the item (1) and items (7) to (9) in the description of the first embodiment.

The vehicle abnormality monitoring apparatus according to the second embodiment is not limited to the mode of processing described above when used in a system employing an on-vehicle navigation control unit as described above, and the apparatus may be modified as follows.

Third Embodiment

Figure 11:
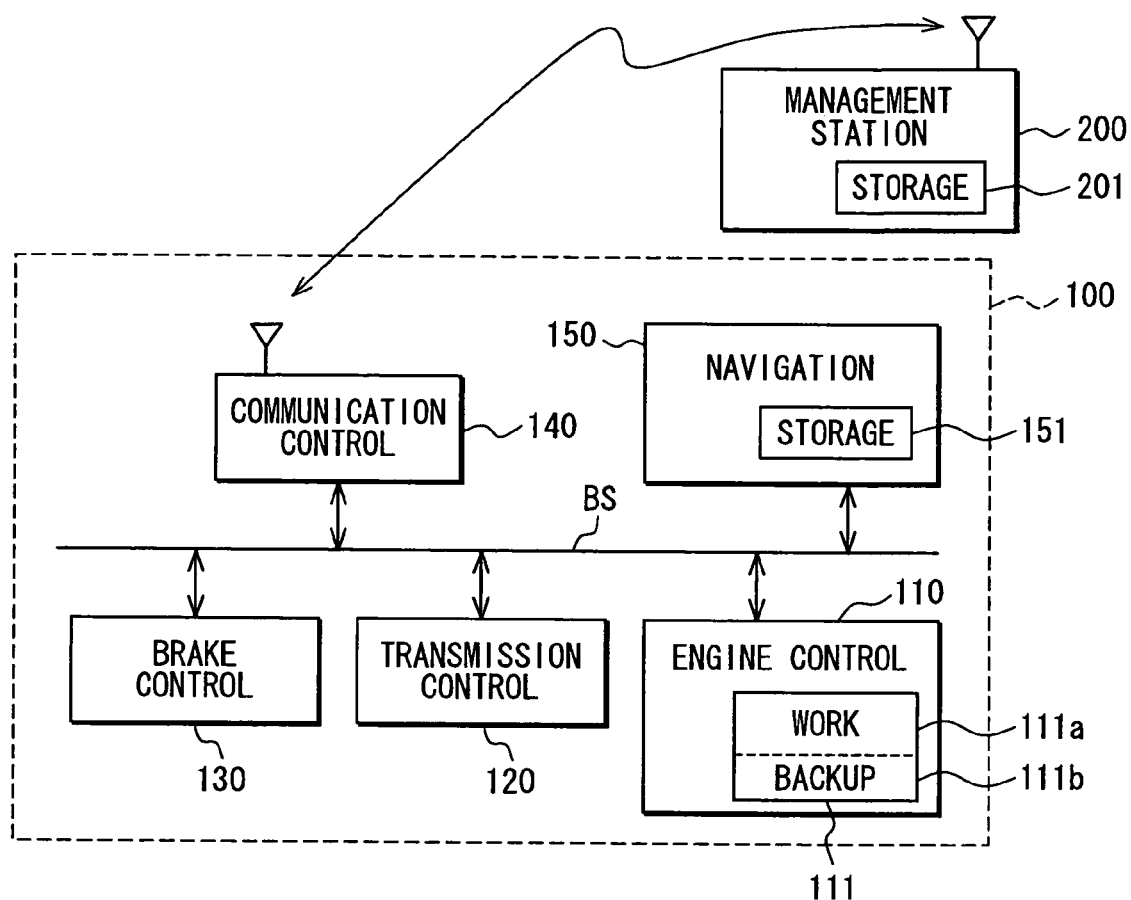
FIG. 11 is a block diagram showing a system employing a vehicle abnormality monitoring apparatus according to a third embodiment.

In the second embodiment, the storage unit (hard disk) 151 in the navigation control unit 150 is used as the final place to save time-sequential freeze frame data. However, in a case wherein the on-vehicle network exchanges information with the management station 200 shown in FIG. 1 as illustrated in FIG. 11, time-sequential freeze frame data saved in the storage unit 151 may be further saved at the management station 200 through radio communication, for example, based on the processing procedure shown in FIG. 12. The use of such a mode of processing allows freeze frame data to be more easily utilized to provide various advantages. For example, the management station 200 provided outside the vehicles can notify the user (driver) of a vehicle of interest the fact that an abnormality of the vehicle equipment has been detected. It is also possible to collect statistics of vehicle equipment abnormalities of, for example, each vehicle type or production lot and to make use of the statistics in vehicle development (e.g., safety measures). As a result, adequate services will become available, in particular, when vehicle maintenance is carried out.

A memory operation performed by the navigation control unit 150 in the third embodiment will now be described with reference to FIG. 12. The same process is repeated at predetermined intervals.

The navigation control unit 150 first determines whether time-sequential freeze frame data has been transmitted from the engine control unit 110 or not as a process at step S241. When it is determined that there is transmission of data, the time-sequential freeze frame data is stored in the storage unit 151 (step S242), and the time-sequential freeze frame data is transmitted to the management station 200 on a radio communication basis (steps S243 and S244). Next, the properness of the communication (that is, reception of the freeze frame data by the management station 200) is determined, and the time-sequential freeze frame data is erased from the storage unit 151 (step S246) when it is determined that the communication has been properly performed (step S245).

When there is no transmission from the engine control unit 110 at the process of step S241, the time-sequential freeze frame data is erased from the storage unit 151 at the processes of steps S243 to S246 without executing the process of step S242. It should be noted that it may be determined at the process of step S243 that the time-sequential freeze frame data is not stored in the storage unit 151. In such a case, the control is terminated at that time.

In the third embodiment, it is determined that proper communication has been made (at step S245) based on the fact that the management station 200 has provided information indicating proper reception of time-sequential freeze frame data within a predetermined period of time after the transmission of the time-sequential freeze frame data (reception complete notice).

As described above, the third embodiment can provide advantages which are the same as those listed above in the item (1) and items (7) to (9). It is also possible to achieve the same or substantially the same advantage as that listed in the item (2) in the description of the first embodiment.

Other Embodiments

The above embodiments may be carried out by modifying them as follows.

Plural items of data indicating the operating status of vehicle equipment are stored in the work area 111a of the data memory 111 in normal cases including the above embodiments, and some of the plural items of data (such as an engine rotational speed and an intake air amount) are used as time-sequential freeze frame data. In the above embodiments, such time-sequential freeze frame data is saved in an external storage unit through communication. The properness of the communication is determined, and the time-sequential freeze frame data is erased from the backup area 111b when it is determined that the communication has been properly performed. However, when other items of data which are not used as the time-sequential data among the plural items of data stored in the work area 111a are also saved in the external storage unit in addition, a closer analysis can be made based on the data.

The saving process procedure will now be described with reference to FIG. 13. It is assumed that the storage unit 201 of the management station 200 is used as the destination to which the data is to be saved. When the time-sequential freeze frame data is stored in the backup area 111b (step S331), the engine control unit 110 first determines whether the supply of power from the vehicle battery to the engine control unit 110 is continued or not from the state of a trip determination flag (step S332). The trip determination flag is set when an abnormality of vehicle equipment is detected as a result of abnormality monitoring and reset when the ignition switch of the vehicle is turned on. Therefore, when it is determined that the trip determination flag is set at the process of step S332, the engine control unit 110 proceeds to a process at step S333 based on a determination that the supply of power to the engine control unit 110 is kept continued. At the process of step S333, items of data useful for an analysis of the abnormality (e.g., values output by various sensors and the state of input/output ports) among the data stored in the work area 111a are transmitted in addition to the time-sequential freeze frame data stored in the backup area 111b.

When it is determined that the trip determination flag is reset at the process of step S332, the supply of power to the engine control unit 110 has been once interrupted, and the data in the work area 111a has already been lost. Therefore, in this case, the engine control unit 110 transmits only the time-sequential freeze frame data saved in the backup area 111b to the management station 200 (step S334). In either case, the properness of radio communication is determined once the contents stored in the data memory 111 are transmitted to the management station 200 through radio communication, and the time-sequential freeze frame data is erased from the backup area 111b (step S335) when it is determined that the communication has been properly performed (S336).

Figure 12:
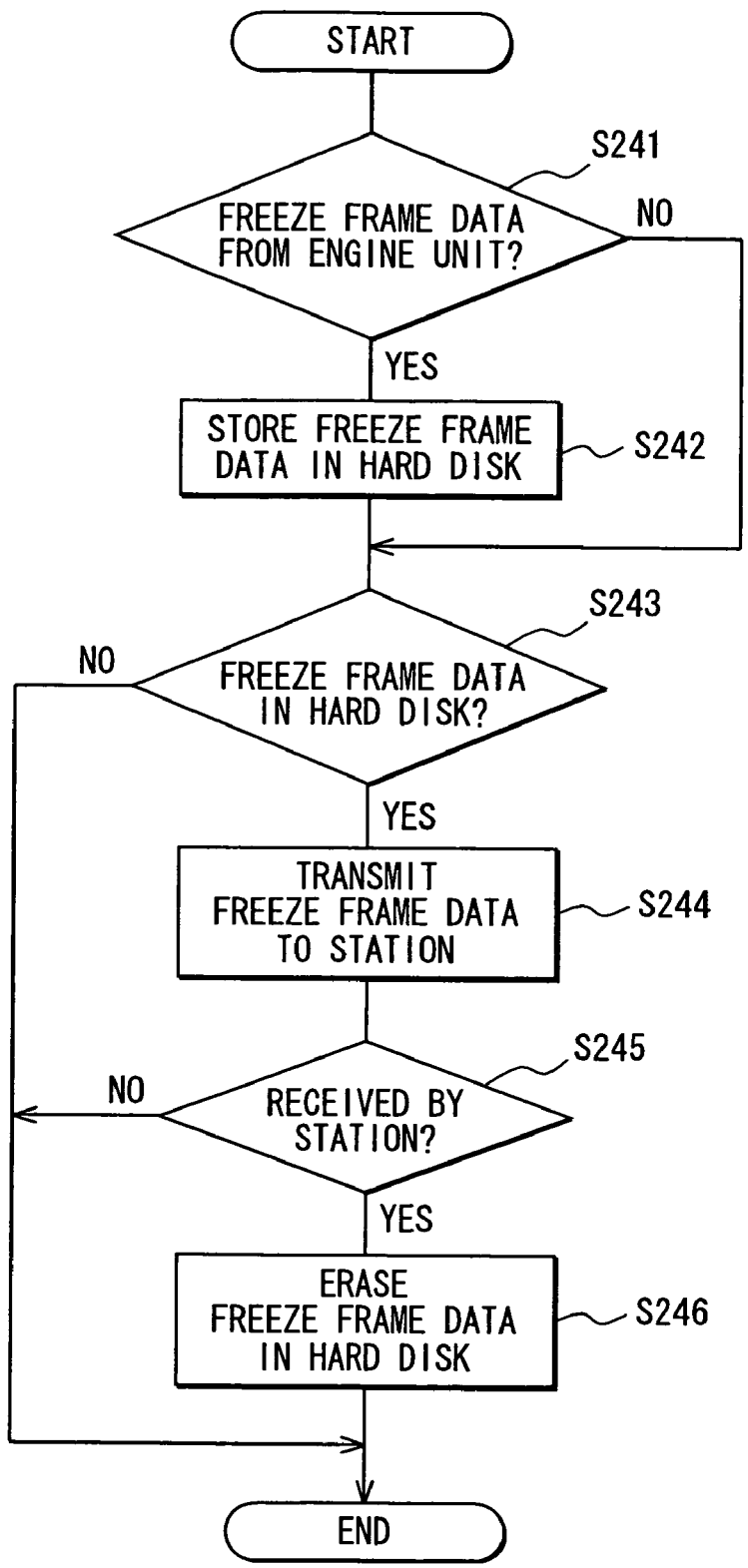
FIG. 12 is a flow chart showing a processing procedure for a memory operation performed by a navigation control unit of the modification.
Figure 13:
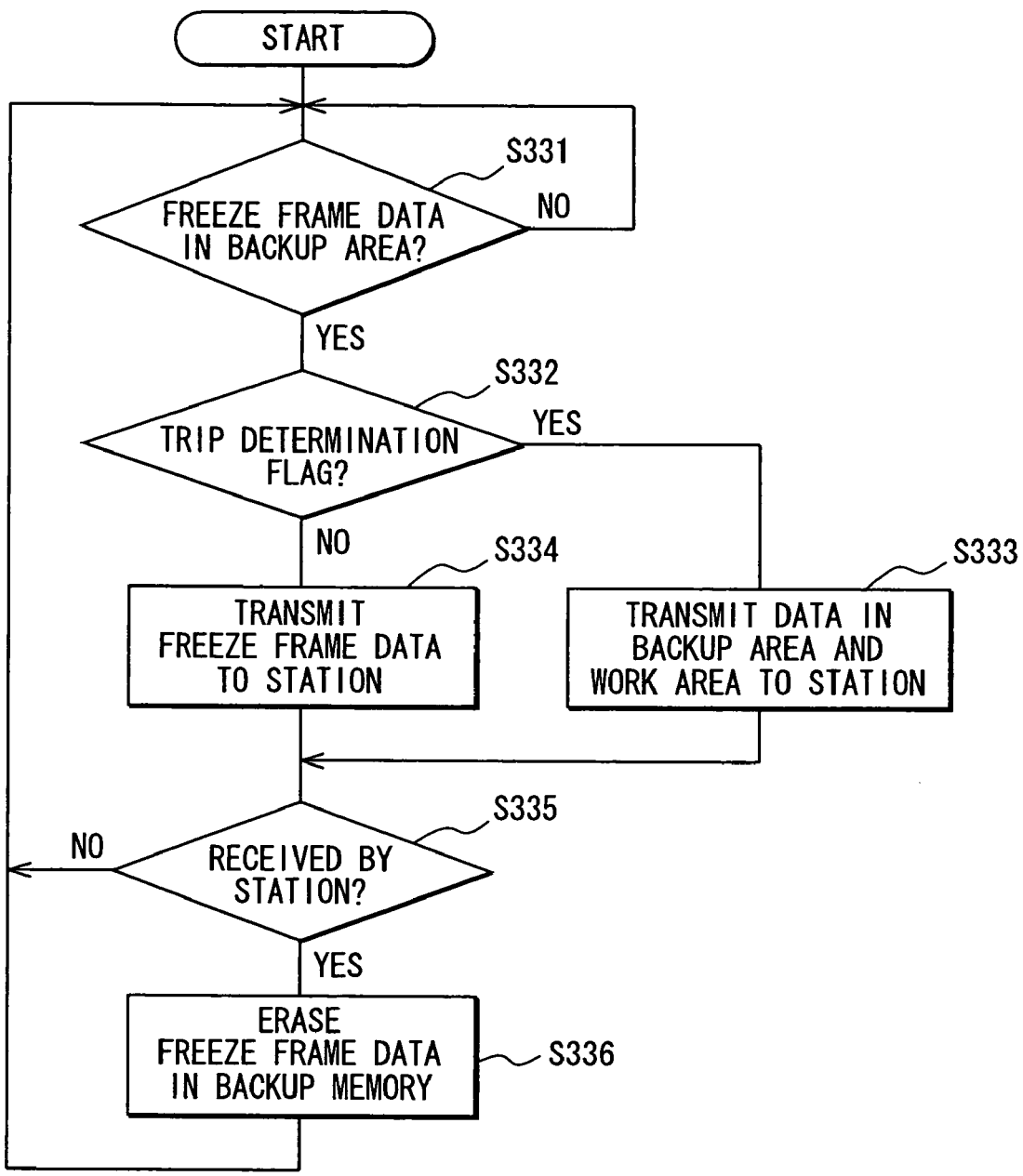
FIG. 13 is a flow chart showing another example of the memory operating procedure for the operation of erasing time-sequential freeze frame data from a backup area performed by a vehicle abnormality monitoring apparatus according to modification.

In the processing procedure shown in FIGS. 12 and 13, the data of interest may be re-transmitted to the management station 200 when a reception complete notice as described above is not received (steps S245 and S335). For example, the process at step S244 or step S332 may be executed again after the processes at steps S135 to S137 of the first embodiment are executed, which allows data of interest to be properly transmitted to the management station 200. In this particular case, it is desirable to execute the process at step S138 of the first embodiment (turning the MIL on) in addition from a practical point of view.

Figure 14:
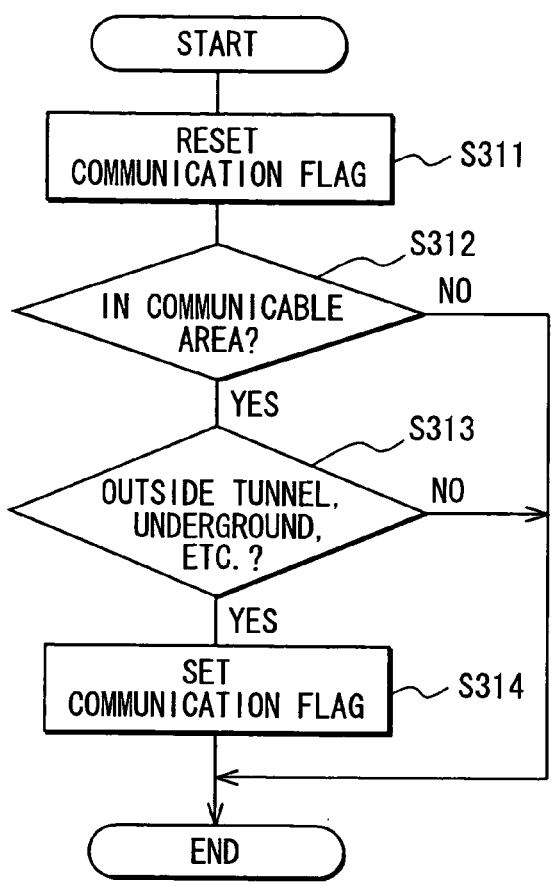
FIG. 14 is a flow chart showing a processing procedure for another example of the determination of communication environment.

In a system in which the navigation control unit 150 is loaded on a vehicle, the engine control unit 110 may perform the determination of communication environment (step S136) based on position information obtained through the navigation control unit 150. When communication environment is determined in this case, as shown in FIG. 14, a communication flag is reset as a process at step S311. In this state, a determination is made based on the position information from the navigation control unit 150 on whether a logical AND condition is satisfied where (A) the vehicle is in a communicable area (step S312) and (B) the vehicle is outside a special situation, e.g., outside a tunnel or underground (step S313). When the AND condition is satisfied, the control is terminated at the point in time when the communication flag is set (step S314). As a result, at the process of the subsequent step S137 (FIG. 6), the environment of communication with the management station 200 is determined to be good based on the fact that the communication flag is set. However, when the logical AND condition is not satisfied between the conditions (A) and (B) (steps S312 and S313), the control is terminated at that time without executing the process at step S314. In this case, it is determined that the environment of communication with the management station 200 is not good at the process of step S137 (FIG. 6), and the processes shown by way of example in FIG. 14 are repeated until the communication environment is determined to be good at the process of step S137.

Time-sequential freeze frame data may be added with time information indicating the time of detection of an abnormality of vehicle equipment as a result of abnormality monitoring. In such a configuration, the management station 200 can recognize the period for which the time-sequential freeze frame data is not transmitted to the management station 200 or the period for which the time-sequential freeze frame data is not erased based on a comparison between the time information and the time of reception of the data.

Time-sequential freeze frame data may be added with time data (time information) indicating total time during which the backup area 111b had no vacant capacity sufficient to store the time-sequential freeze frame data and during which the ignition switch of the vehicle is on since the time when an abnormality of the vehicle equipment is detected through abnormality monitoring. Such a configuration makes it possible to easily recognize the time during which the time-sequential freeze frame data is not erased from the backup area 111b even through the abnormality monitoring has been executed.

Figure 15:
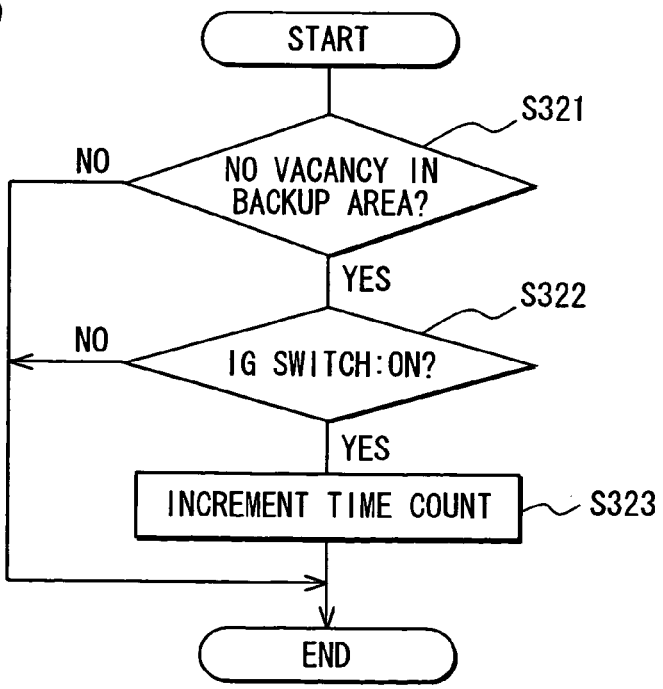
FIG. 15 is a flow chart showing a memory operating procedure for a memory operation for adding time information to time-sequential freeze frame data.

This memory operating procedure will now be described with reference to FIG. 15. For example, the process is repeated every second. It is assumed here that the capacity of the backup area 111b is set to allow up to three items of the time-sequential freeze frame data to be stored, as shown in FIG. 16. In FIG. 16, each item of data is followed by (r, s, t), "r" indicating the frame number of the data, "i" indicating the place of the data in a sampling sequence, "j" indicating the type of the data. In FIG. 16, an item of data for which a sampling sequence value "0" is set is data sampled at a time when there is abnormality. Time data as described above is added to each item of data sampled at a time when there is abnormality. At this process, as shown in FIG. 15, the engine control unit 110 first determines whether a logical AND condition is satisfied where (A) the backup area 111b has no vacant capacity sufficient to store new time-sequential freeze frame data (step S321) and (B) the ignition switch of the vehicle is on (step S322). When the logical AND condition is satisfied between the conditions (A) and (B), time count is incremented by adding "1" to each of the time data of three items of time-sequential freeze frame data FFD1 to FFD3 stored in the backup area 111b. When the logical AND condition is not satisfied between the conditions (A) and (B), the control is once terminated at that time without executing the process at step S323. Since such a process is executed every second, the time data added to the time-sequential freeze frame data indicates total time during which the time-sequential freeze frame data is not erased from the backup area 111b even though the abnormality monitoring is performed.

Figure 17:
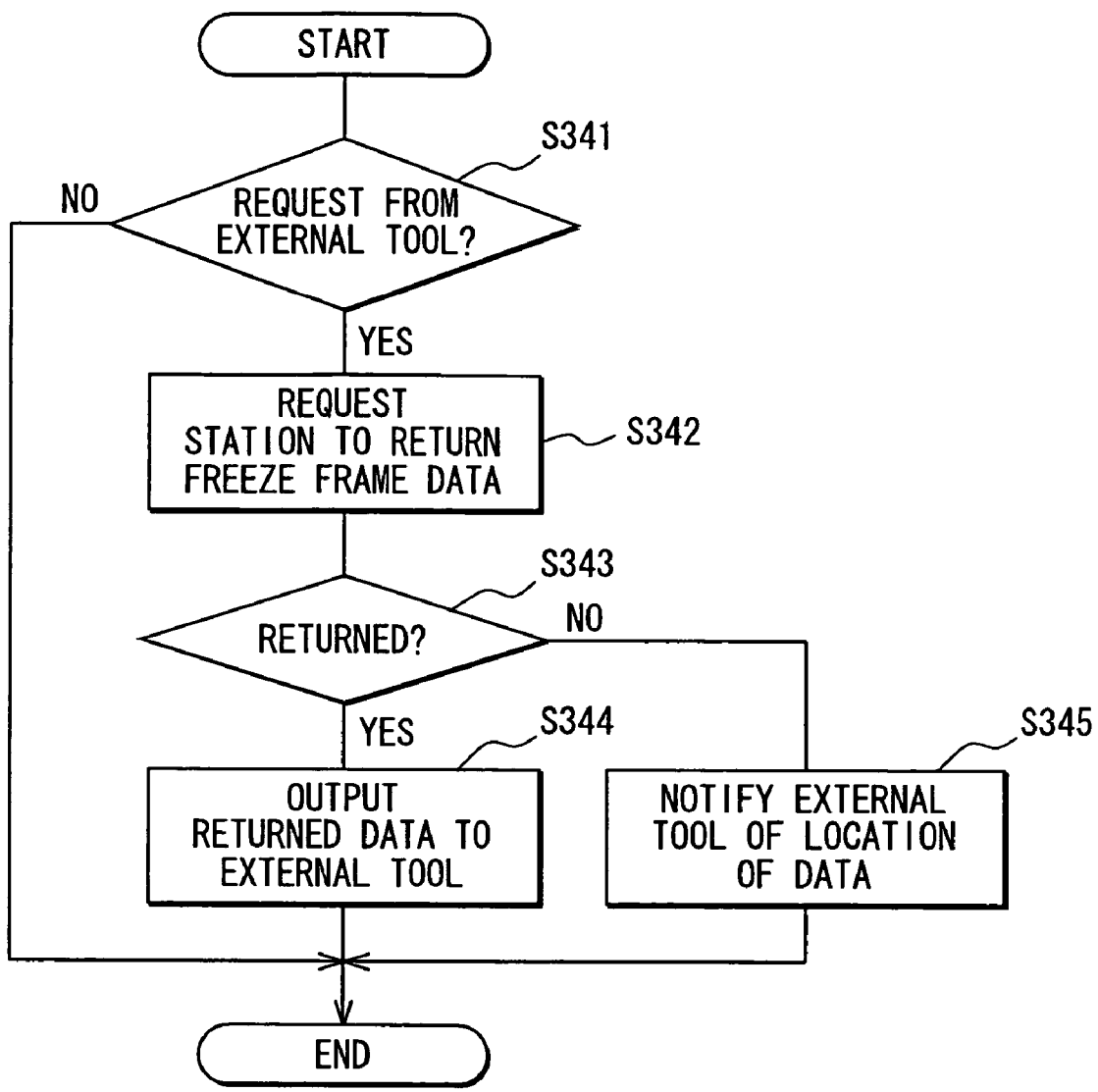
FIG. 17 is a flow chart showing a processing procedure for a responding process performed based on an advice of a request for output of time-sequential freeze frame data from an external tool.

When the engine control unit (vehicle abnormality monitoring apparatus) 110 can be connected to an external tool 10 through a communication line, a request for output of time-sequential freeze frame data may be advised through the external tool 10 at a car dealer or a repair shop. In such a case, the car dealer or repair shop may not be able to provide appropriate services when the time-sequential freeze frame data has already been saved in a storage unit outside the vehicle and when the data has already been erased from the data memory 111. In this regard, such a concern can be preferably eliminated if the engine control unit 110 responds to the output request from the external tool 10 according to the procedure shown in FIG. 17. This process is repeated at each of predetermined periods.

Specifically, when a request for output of time-sequential freeze frame data is advised through the external tool 10 (step S341), the engine control unit 110 first advises the management station 200 of a request for returning of the time-sequential freeze frame data (step S342). Next, the control unit determines whether the data has been returned from the management station 200 within a predetermined period after the advice of the return request (step S343). When the time-sequential freeze frame data is returned, the control unit outputs the returned data to the external tool 10 (step S344). When the time-sequential freeze frame data is not returned at the process of step S343, information indicating that the time-sequential freeze frame data is stored and maintained at the management station 200 is output to the external tool 10 (step S345). Thus, the external tool 10 is notified where the freeze frame data is stored and maintained.

The processes at step S135 to S137 in the first embodiment are not limited to the re-transmission of time-sequential freeze frame data and may be performed each time the time-sequential freeze frame data is transmitted.

When the engine control unit (vehicle abnormality monitoring apparatus) 110 is a type incorporating a communication unit for radio communication with the management station 200, loads exerted on a communication line such as an on-vehicle network constructed in a vehicle can be preferably suppressed when time-sequential freeze frame data is saved in an external storage unit.

Time-sequential freeze frame data may be stored in the backup area 111b according to any procedure.

Any type of time-sequential freeze frame data may be used as long as it indicates changes in the operating status of vehicle equipment during a period around the occurrence of an abnormality of the vehicle equipment, and any number of data may be sampled.

It is not essential to use time-sequential freeze frame data as the freeze frame data. What is required is that the data indicates the operating status of vehicle equipment at the time when an abnormality of the vehicle equipment is detected as a result of abnormality monitoring.

Any determination method may be used for the determination of communication environment (step S316) as long as the method makes it possible to determine whether information can be properly exchanged between the vehicle and the management station 200.

Any method including a method of notification utilizing E-mails may be used to notify a user of information indicating the fact that abnormality has occurred in communication between the vehicle and the management station (step S138).

It is not essential to notify a user of information indicating the fact that abnormality has occurred in communication between the vehicle and the management station (step S138). It is also unessential to execute the re-transmission of freeze frame data.

The data memory 111 may be a memory constructed with any volatile memory and any non-volatile memory (including a hard disk).

The data memory 111 may be constructed with either volatile memory or non-volatile memory. However, when the data memory 111 is constructed with only a volatile memory, all freeze frame data in the data memory 111 must be saved in an external storage unit through communication during a period in which the supply of power from a vehicle battery to the engine control unit 110 is continued. In this case, the freeze frame data stored in the volatile memory becomes the object of erasure when it is determined that the communication is properly performed.

It is not essential to maintain the supply of power from a vehicle battery to the engine control unit 110 for the time required for communication based on the fact that the ignition switch of the vehicle may be turned off during the transmission of freeze frame data.

The vehicle abnormality monitoring apparatus is not limited to the engine control unit 110 and may be any control unit.

Data to be saved or erased from the data memory 111 is not limited to freeze frame data, and it may be any type of data which is used for analyzing abnormality of a vehicle (data for abnormality analysis). Data for abnormality analysis is data which is associated with the state of occurrence of abnormality, for example, at sensors, actuators, or an engine control unit, and which is information serving as a useful reference for an analysis of the abnormality. In some case, for detecting deterioration of an actuator, for example, a learned value of an instrumental error of an actuator (which varies depending on aging) is periodically stored at each of predetermined times or distances traveled by the vehicle after it is sold, and deterioration of the actuator is detected based on changes in the learned value of the instrumental error. Data for abnormality analysis include such a learned value of an instrumental error which can serve as history information.

What is claimed is:

1. A vehicle abnormality monitoring apparatus comprising:
   an electronic unit including a data memory for storing abnormality analysis data used for analyzing abnormality of vehicle equipment, the electronic unit being connectable to an external tool through a communication line; and
   a storage unit provided separately from the electronic unit for storing the abnormality analysis data when transmitted from the data memory through communication, the storage unit being provided in a management station provided outside a vehicle,
   the electronic unit being configured to perform a memory operation of erasing the abnormality analysis data from the data memory after transmission of the abnormality analysis data to the storage unit, and
   the electronic unit being further configured to notify the management station of a request for returning of the abnormality analysis data when output of the abnormality analysis data is requested from the external tool and output the abnormality analysis data returned from the management station to the external tool,
   the abnormality analysis data being data indicating an operating status of the vehicle equipment at the time when an abnormality of the vehicle equipment is detected as a result of abnormality monitoring on the vehicle equipment performed based on a sensor output from a sensor for detecting a physical quantity which changes depending on the operating status of the vehicle equipment, and
   the abnormality analysis data requested for return is the same data as that transmitted from the data memory of the electronic unit to the storage unit of the management station.

2. A vehicle abnormality monitoring apparatus according to claim 1,
   the abnormality analysis data being freeze frame data indicating the operating status of the vehicle equipment at the time when the abnormality of the vehicle equipment is detected as the result of abnormality monitoring on the vehicle equipment performed based on the sensor output from a sensor for detecting a physical quantity which changes depending on the operating status of the vehicle equipment, and
   the electronic unit being configured to erase the freeze frame data by determining properness of the communication.

3. A vehicle abnormality monitoring apparatus according to claim 2,
   the electronic unit being configured to maintain a supply of power from a vehicle battery for a time period required for saving the freeze frame data when a key switch of the vehicle is turned off when the freeze frame data is being saved.

4. A vehicle abnormality monitoring apparatus according to claim 2,
   the management station being configured to manage the freeze frame data outside the vehicle,
   saving of the freeze frame data through communication being executed through radio communication with the management station,
   the electronic unit being configured to determine that the communication is properly performed based on information indicating proper reception of the freeze frame data provided by the management station.

5. A vehicle abnormality monitoring apparatus comprising:
   an electronic unit including a data memory for storing abnormality analysis data used for analyzing abnormality of vehicle equipment, the electronic unit being connectable to an external tool through a communication line; and
   a storage unit provided separately from the electronic unit for storing the abnormality analysis data when transmitted from the data memory through communication, the storage unit being provided in a management station provided outside a vehicle,
   the electronic unit being configured to perform a memory operation of erasing the abnormality analysis data from the data memory after transmission of the abnormality analysis data to the storage unit;
   the electronic unit being further configured to notify the management station of a request for returning of the abnormality analysis data when output of the abnormality analysis data is requested from the external tool and output the abnormality analysis data returned from the management station to the external tool;
   the abnormality analysis data being freeze frame data indicating an operating status of the vehicle equipment at the time when an abnormality of the vehicle equipment is detected as a result of abnormality monitoring on the vehicle equipment performed based on a sensor output from a sensor for detecting a physical quantity which changes depending on the operating status of the vehicle equipment;
   the electronic unit being configured to erase the freeze frame data by determining properness of the communication;
   the management station being configured to manage the freeze frame data outside the vehicle;
   saving of the freeze frame data through communication being executed through radio communication with the management station;
   the electronic unit being configured to determine that the communication is properly performed based on information indicating proper reception of the freeze frame data provided by the management station; and
   the electronic unit being further configured to re-transmit the freeze frame data to the management station, when the information indicating proper reception of the freeze frame data is not provided from the management station within a predetermined period after the transmission of the freeze frame data.

6. A vehicle abnormality monitoring apparatus according to claim 5,
   the electronic unit being further configured to count the number of consecutive re-transmissions of the freeze frame data and stop the re-transmission of the freeze frame data on an assumption that abnormality has occurred in communication between the vehicle and management station, when the information indicating proper reception of the freeze frame data is not provided from the management station after the counted number of consecutive re-transmissions reaches a predetermined number of times.

7. A vehicle abnormality monitoring apparatus according to claim 5,
   the electronic unit being further configured to count the number of consecutive re-transmissions of the freeze frame data and provide a user of information indicating that abnormality has occurred in communication between the vehicle and management station when the information indicating proper reception of the freeze frame data is not provided from the management station after the counted number of consecutive re-transmissions reaches a predetermined number of times.

8. A vehicle abnormality monitoring apparatus according to claim 4,
the electronic unit being configured to determine whether or not a communication environment is properly established with the management station for the transmission of the freeze frame data and transmit the freeze frame data when the communication environment is determined to be properly established.

9. A vehicle abnormality monitoring apparatus according to claim 8,
the electronic unit being configured to determine whether the vehicle is in a position where radio communication can be performed with the management station and determine that the communication environment is properly established when the vehicle is determined to be in such a position.

10. A vehicle abnormality monitoring apparatus according to claim 9,
the vehicle having a navigation control unit forming part of a navigation system, and
the electronic unit being configured to determine whether vehicle is in a position in which the radio communication can be performed based on position information obtained through the navigation control unit.

11. A vehicle abnormality monitoring apparatus according to claim 9,
the management station also being configured to exchange with the vehicle information on data other than data associated with the freeze frame data, and
the electronic unit being configured to determine whether the vehicle is in a position in which the radio communication can be performed based on the state of sensitivity in exchanging the information.

12. A vehicle abnormality monitoring apparatus according to claim 1,
the electronic unit being further configured to output information indicating that the abnormality analysis data is stored and maintained in the management station to the external tool, when the abnormality analysis data is not returned from the management station within a predetermined period after notifying the request for returning of the abnormality analysis data.

13. A vehicle abnormality monitoring apparatus according to claim 4,
the electronic unit including a communication unit for performing radio communication with management station.

14. A vehicle abnormality monitoring apparatus according to claim 2,
the storage unit being provided in an on-vehicle control unit for managing the freeze frame data inside the vehicle, so that the saving of the freeze frame data through communication is executed through wire communication with the on-vehicle control unit, and
the electronic unit being configured to determine that the communication is properly performed based on information indicating proper reception of the freeze frame data provided by the on-vehicle control unit.

15. A vehicle abnormality monitoring apparatus according to claim 4,
the data memory including a volatile memory and a non-volatile memory, and
the electronic unit being configured to store data indicating the operating status of the vehicle equipment based on and at the time of detection of an abnormality of the vehicle equipment as a result of the abnormality monitoring in the volatile memory and temporarily save the data stored in the volatile memory in the non-volatile memory as the freeze frame data.

16. A vehicle abnormality monitoring apparatus according to claim 4,
the freeze frame data including time-sequential freeze frame data which indicates the operating status of the vehicle equipment at the point in time of detection of an abnormality of the vehicle equipment, and the status of the same before and after that point in time.

17. A vehicle abnormality monitoring apparatus according to claim 16,
the data memory including a volatile memory and a non-volatile memory, and
the electronic unit being configured to store data indicating the operating status of the vehicle equipment in the volatile memory on a time-sequential basis, associate data indicating the operating status of the vehicle equipment at the point in time of the detection of an abnormality of the vehicle equipment with data indicating the operating status of the vehicle equipment before and after the point in time when an abnormality of the vehicle equipment is detected as a result of the abnormality monitoring, and temporarily save the items of data thus associated in the non-volatile memory as the time-sequential freeze frame data.

18. A vehicle abnormality monitoring apparatus according to claim 17,
the data stored in the volatile memory on a time-sequential basis including at least three items of data sampled at predetermined intervals,
storage of items of data stored on a time-sequential basis in the volatile memory being carried out by sequentially shifting the items of data on a first-in first-out basis so as to maintain a relationship between the items of data sampled at the predetermined intervals and addresses associated with the sequence of sampling of those items of data, and
when an abnormality of the vehicle equipment is detected as a result of abnormality monitoring, the electronic unit being configured to associate the item of data indicating the operating status of the vehicle equipment at the point in time of detection of the abnormality of the vehicle equipment with the first item of data following the point in time among the items of data thus shifted and at least the two items of data preceding the point in time among the items of data thus shifted, as the time-sequential freeze frame data.

19. A vehicle abnormality monitoring apparatus according to claim 15,
plural items of data indicating the operating status of the vehicle equipment being stored in the volatile memory forming part of the data memory, part of the plural items of data being used as the freeze frame data, and
the electronic unit being configured to determine whether the supply of power from the vehicle battery has been continued since an abnormality of the vehicle equipment is detected as a result of the abnormality monitoring at the time of communication of the freeze frame data and save data, which is not used as the freeze frame data, among the plural items of data indicating the operating status of the vehicle equipment stored in the volatile memory in the storage unit, along with the freeze frame data, based on a determination that the supply of power is continued.

20. A vehicle abnormality monitoring apparatus according to claim 2,
    time information indicating time at which an abnormality of the vehicle equipment being detected as a result of the abnormality monitoring is added to the freeze frame data.

21. A vehicle abnormality monitoring apparatus according to claim 2,
    the freeze frame data being added with time information indicating total time during which the data memory had no vacant capacity sufficient to store the freeze frame data and during which a key switch of the vehicle is on since the time when an abnormality of the vehicle equipment is detected as a result of the abnormality monitoring.

22. A method of operating a vehicle abnormality monitoring apparatus, the method comprising:
    storing abnormality analysis data used for analyzing abnormality of vehicle equipment in a data memory of an electronic unit, the electronic unit being connectable to an external tool through a communication line; and
    transmitting, from the electronic unit, the abnormality analysis data stored in the data memory to a storage unit provided separately from the electronic unit for storing the abnormality analysis data, the storage unit being provided in a management station provided outside a vehicle;
    erasing the abnormality analysis data from the data memory after transmission of the abnormality analysis data to the storage unit;
    notifying the management station of a request for returning the abnormality analysis data when a request for output of the abnormality analysis data is received, in the electronic unit, from the external tool;
    receiving, in the electronic unit, the abnormality analysis data returned from the management station in response to said notifying; and
    outputting the abnormality analysis data returned from the management station to the external tool;
    the abnormality analysis data being data indicating an operating status of the vehicle equipment at the time when an abnormality of the vehicle equipment is detected as a result of abnormality monitoring on the vehicle equipment performed based on a sensor output from a sensor for detecting a physical quantity which changes depending on the operating status of the vehicle equipment, and
    the abnormality analysis data requested for return is the same data as that transmitted from the data memory of the electronic unit to the storage unit of the management station.

* * * * *